CYRENUS WHEELER, JR., OF AUBURN, NEW YORK.

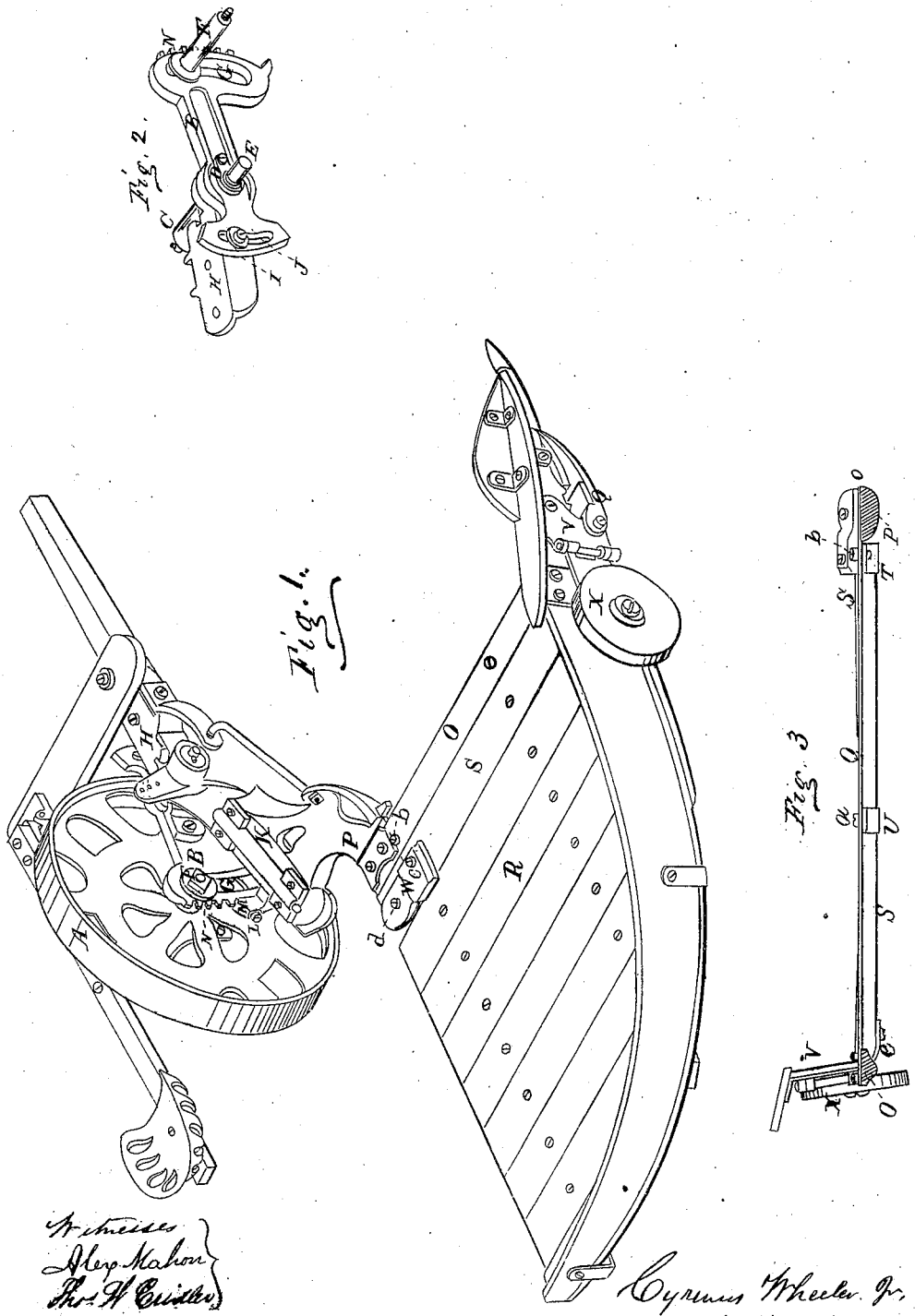

*Letters Patent No. 84,151, dated November 17, 1868.*

IMPROVEMENT IN HARVESTERS.

*The Schedule referred to in these Letters Patent and making part of the same.*

*To all whom it may concern:*

Be it known that I, CYRENUS WHEELER, Jr., of the city of Auburn, county of Cayuga, and State of New York, have invented certain new and useful Improvements in Harvesters; and I hereby declare the following to be a full, clear, and exact description of the same, reference being had to the accompanying drawings, making part of this specification, in which—

Figure 1 is a perspective view of the machine;

Figure 2 is a view of the main frame, tongue-frame, and axle; and

Figure 3, a view of the front edge of finger-bar and platform-connections, with sections of the inner and outer shoes.

Similar letters of reference indicate like parts of the machine wherever they appear in the different figures.

The machine is constructed with three frames, viz, a main frame, a tongue-frame, and a crank-frame, so arranged and combined with each other as to admit of all the required adjustments for both reaping grain and mowing grass.

The invention consists in constructing the main frame with a hollow cylindrical projection on one side, for holding the box of the bevel-wheel shaft, and to serve as a hinge or pivot for connecting the tongue and crank-frames, and having an axle for the driving-wheel, on the other side, that is adjustable, so as to be set at different heights on the main frame, in the arc of a circle, of which the bevel-wheel shaft is the centre, and in devices for locking the tongue and crank-frames to the main frame when adjusted at different heights.

And it further consists in so applying the platform, and uniting it with the finger-bar, as to overcome its tendency to sag or bend when raised for reaping.

In the drawings, A represents the driving-wheel, and B the main frame, which has a hollow cylindrical arm or projection, C, in which is inserted the pipe-box D, which carries the bevel-wheel shaft E.

To the rear part of the main frame, on its other side, is bolted the axle F, on which the driving-wheel is mounted. This axle can be fastened at different heights on the frame, by a series of holes, arranged in the arc of a circle, of which the bevel-wheel shaft E is the centre, or by means of a curved slot, G, similarly arranged, as shown in the drawings.

By this arrangement, the frame can be sustained at different heights above the ground, and the driving-wheel will preserve at all times the proper relation to the bevel-wheel shaft, so that the gear-rim, which may be fastened to the inner web of it, will gear properly with a pinion which may be placed on the projecting end of the bevel-wheel shaft.

The axle is held at the desired point of adjustment on the main frame by means of a through-bolt and nuts, securing a hollow axle-sleeve, or by a screw formed on the end of the axle, passing through the frame.

To the projecting cylindrical arm of the main frame is hinged the tongue-frame H, which can be fastened in any desired position by the clamping-bolt I, which works in a slot, J, formed in the front end of the main frame, or a series of holes, arranged concentric to the bevel-wheel shaft, will serve the same purpose.

The crank-frame K, which carries the cutting-apparatus, also hinges upon the main frame, at the same point with the tongue-frame, and is free to move on the cylindrical part C, as on a hinge, except when restrained by the set-bolt L in the hook M. This hook is fastened to the frame K, and has a groove, for embracing the rear of the main frame B, which is a sector in form, and has a series of notches or recesses formed in it, for receiving the end of the set-bolt L.

The finger-bar O is bolted to the shoe P of the main frame, at its inner end, and it has a shoe, Q, fastened to its outer end.

When arranged for mowing, the axle F is fastened near the highest point on the main frame B, and the crank-frame K is permitted to move unrestrained by the main frame, so that it is free to follow the surface of the ground, thus permitting the cutting-apparatus to rise and fall, to conform to the undulations and inequalities thereof.

The cutters can, by means of the clamping-bolt I, be set at any angle the condition of the crop or the nature of the ground may require.

The platform R has on its front edge a stiffening-bar, S, which is fastened to the finger-bar by two metallic straps, T and U, which bolt to the under side of the finger-bar by bolts $a$ and $b$, and at its outer end it is fastened to the table-plate V, which is united to the outer shoe Q by an ear inserted in the jaws of the shoe, and fastened by a bolt through both. The inner end of the bar S is fastened to the shoe P by a plate, W, and bolts $c$ and $d$.

The strap U, to which the finger-bar O is bolted, is raised above the plane of the strap T, and the flange $e$, which holds the other end of the stiffening-bar S, and is so arranged as to support the outer end of the finger-bar O in the same plane as the strap T at its inner end.

By this arrangement, the finger-bar O, when bolted to the platform, is crowned or curved upwards in the middle. This should be something more than the sagging or bending downward of the platform in the middle, when supported by the table-wheel at its outer end, and the driving-wheel at the other end, and this will be determined by the length of finger-bar, and the kind of materials used.

When properly arranged, and in use, the finger-bar will assume nearly a straight line, and all cramping and binding of cutters will be avoided. Thus it will be seen that the injurious effects of the platform's sagging or bending, when used in reaping, is counteracted by forming the bed, by which the finger-bar is united to the platform, of arched or convex form, sufficient to compensate for the sag or bend of the platform.

The platform R is quadrant-shaped, and is adjusted and supported at any desired height by the table-wheel X, at its outer end, and by the driving-wheel A, at its inner end, which, with its axle F, is adjustable at different heights on the main frame B. Or the adjustment may be made by raising the crank-frame K, and fastening it, by set-screw L, to the main frame B, at the desired height, and adjusting the angle of the platform and finger-bar by the clamping-bolt I, which locks the tongue-frame H and main frame B together.

It will thus be seen that by the arrangement of the parts described, any desired height of cut can be obtained, and the platform and finger-bar, at the different heights, still retain the same angle of presentation.

The seat for the driver is supported by a cross-bar bolted to the tongue-frame, and projecting outwards far enough to hold the front end of the seat-bar, which is fastened, near its centre, to a brace connected with the outer end of the axle F.

Having described my invention, its construction and operation,

What I claim as new, and desire to secure by Letters Patent, is—

1. A main frame, having a tubular projection on one side, for supporting the bevel-wheel shaft, in combination with an axle for the driving-wheel, bolted to the other side, substantially as described.

2. A main frame, having a tubular projection on one side, for supporting the bevel-wheel shaft, in combination with an adjustable axle on the other side, for receiving the driving-wheel, substantially as and for the purposes described.

3. In combination with a main frame and an adjustble crank-frame, an adjustable axle, as and for the purposes set forth.

4. In combination with a main frame, an adjustable crank-frame, an adjustable tongue-frame, and an adjustable axle, substantially as set forth.

5. So uniting the platform with the finger-bar as to compensate for the sag of the platform, or its tendency to spring or bend when in use in reaping.

C. WHEELER, Jr.

Witnesses:
HORACE T. COOK,
CHAS. L. WHEATON, Jr.